US012020850B2

(12) United States Patent
Shiga et al.

(10) Patent No.: US 12,020,850 B2
(45) Date of Patent: Jun. 25, 2024

(54) MULTILAYER COIL COMPONENT

(71) Applicant: TDK CORPORATION, Tokyo (JP)

(72) Inventors: Yuto Shiga, Tokyo (JP); Hajime Kato, Tokyo (JP); Junichiro Urabe, Tokyo (JP); Kazuya Tobita, Tokyo (JP); Youichi Kazuta, Tokyo (JP); Noriaki Hamachi, Tokyo (JP); Toshinori Matsuura, Tokyo (JP); Yuichi Takubo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 660 days.

(21) Appl. No.: 17/191,017

(22) Filed: Mar. 3, 2021

(65) Prior Publication Data

US 2021/0280362 A1 Sep. 9, 2021

(30) Foreign Application Priority Data

Mar. 4, 2020 (JP) ................................ 2020-036832

(51) Int. Cl.
*H01F 27/29* (2006.01)
*H01F 17/00* (2006.01)

(52) U.S. Cl.
CPC ....... *H01F 27/292* (2013.01); *H01F 17/0013* (2013.01)

(58) Field of Classification Search
CPC .......................... H01F 27/292; H01F 17/0013
See application file for complete search history.

(56) References Cited

U.S. PATENT DOCUMENTS

2006/0006972 A1* 1/2006 Tozawa ................. H01F 27/292 336/200
2007/0223170 A1* 9/2007 Sato ....................... H01C 7/102 257/E25.032
2014/0078643 A1* 3/2014 Odahara ............... H01F 27/292 156/89.12
2014/0224418 A1* 8/2014 Seko ..................... H01F 41/041 156/250
2015/0137929 A1* 5/2015 Park .................... H01F 17/0013 336/200
2018/0027658 A1* 1/2018 Choi ...................... H05K 1/181 174/260
2018/0182533 A1* 6/2018 Muneuchi ............... H01F 27/36
2018/0197675 A1* 7/2018 Kido ..................... H01F 41/122
(Continued)

FOREIGN PATENT DOCUMENTS

JP 2014-154716 A 8/2014

*Primary Examiner* — Malcolm Barnes
(74) *Attorney, Agent, or Firm* — Oliff PLC

(57) ABSTRACT

A multilayer coil component includes an element body, a coil disposed in the element body, and a terminal electrode disposed on the element body. The element body has a first side face and a second side face, a first end face and a second end face, and a first main face and a second main face. The terminal electrode includes a first electrode portion and a second electrode portion. The first electrode portion has a first exposed face exposed on the first main face. The second electrode portion has a second exposed face exposed on the first end face. The first exposed face and the second exposed face are adjacent to each other interposing a ridge portion. The first exposed face is separated from an outer edge of the first main face. The second exposed face is separated from an outer edge of the first end face.

9 Claims, 6 Drawing Sheets

(56) References Cited

U.S. PATENT DOCUMENTS

| | | | | |
|---|---|---|---|---|
| 2019/0006084 | A1* | 1/2019 | Shiga | H01F 5/04 |
| 2019/0006089 | A1* | 1/2019 | Kudo | H01F 5/003 |
| 2019/0214182 | A1* | 7/2019 | Imada | H01F 41/043 |
| 2019/0333689 | A1* | 10/2019 | Park | H01F 27/32 |

* cited by examiner

MULTILAYER COIL COMPONENT

TECHNICAL FIELD

The present disclosure relates to a multilayer coil component.

BACKGROUND

Japanese Unexamined Patent Publication No. 2014-154716 discloses an electronic component including an element body formed by laminating a plurality of insulator layers, a circuit element provided in the element body, and a terminal electrode electrically connected to the circuit element. In this electronic component, the terminal electrode is continuously formed over two adjacent surfaces of the element body.

SUMMARY

In the above electronic component, the terminal electrode can peel off due to external stress.

One aspect of the present disclosure provides a multilayer coil component capable of preventing a terminal electrode from peeling off.

A multilayer coil component according to one aspect of the present disclosure includes an element body, a coil disposed in the element body, and a terminal electrode disposed on the element body. The element body includes a plurality of insulator layers laminated in a first direction. The element body has a rectangular parallelepiped shape. The element body has a first side face and a second side face, a first end face and a second end face, and a first main face and a second main face. The first side face and the second side face are opposed to each other in the first direction. The first end face and the second end face are opposed to each other in a second direction intersecting the first direction. The first main face and the second main face are opposed to each other in a third direction intersecting the first direction and the second direction. The terminal electrode includes a first electrode portion and a second electrode portion. The first electrode portion has a first exposed face exposed on the first main face. The second electrode portion has a second exposed face exposed on the first end face. The first exposed face and the second exposed face are adjacent to each other interposing a ridge portion formed by the first main face and the first end face of the element body. The first exposed face is separated from an outer edge of the first main face. The second exposed face is separated from an outer edge of the first end face.

In this multilayer coil component, the first exposed face is separated from the outer edge of the first main face. The second exposed face is separated from an outer edge of the first end face. That is, the entire first exposed face is surrounded by the first main face. The entire second exposed face is surrounded by the first end face. For this reason, the area in which the first electrode portion is in contact with the element body and the area in which the second electrode portion is in contact with the element body are larger than those when the terminal electrode is continuously formed from the first main face to the first end face. Thus, the adhesive force between the terminal electrode and the element body is increased, and peeling off of the terminal electrode from the element body is prevented.

The coil may include a coil axis along the first direction. In this case, a magnetic flux is generated along the first direction. The terminal electrode is provided on the first main face and the first end face. Thus, the magnetic flux intersecting the terminal electrode is reduced as compared with that when the terminal electrode is provided on the first side face or the second side face intersecting the first direction. Accordingly, it is possible to improve the Q value.

The multilayer coil component may further include a connecting conductor connecting an end portion of the coil and the second electrode portion. The connecting conductor may be connected closer to the second main face than a center of the second electrode portion in the third direction and extend toward the second main face. In this case, it is possible to reduce stray capacitance (parasitic capacitance) formed between the second electrode portion and the connecting conductor.

The first electrode portion may have a first opposing face opposed to the first exposed face and a pair of third side faces connecting the first exposed face and the first opposing face and opposed to each other in the second direction. Each of the pair of third side faces may be curved. In this case, the occurrence of cracks in the element body is prevented.

The second electrode portion may have a second opposing face opposed to the second exposed face and a pair of fourth side faces connecting the second exposed face and the second opposing face and opposed to each other in the third direction. Each of the pair of fourth side faces may be curved. In this case, the occurrence of cracks in the element body is prevented.

The first electrode portion and the second electrode portion may not be electrically connected to each other in the element body. In this case, there is no electrical path between the first electrode portion and the second electrode portion in the element body. If there are two electrical paths between the first electrode portion and the second electrode portion inside and outside the element body, the electrical characteristics can be adversely affected. In this case, even if an electrical path is formed between the first electrode portion and the second electrode portion outside the element body, the adverse effect on the electrical characteristics is reduced.

The first electrode portion may include an end portion in the third direction. The end portion may have an uneven shape. In this case, the adhesive force between the first electrode portion and the element body is increased. Thus, the peeling off of the terminal electrode is further prevented.

The second electrode portion may include an end portion in the second direction. The end portion may have an uneven shape. In this case, the adhesive force between the second electrode portion and the element body is increased. Thus, the peeling off of the terminal electrode is further prevented.

DETAILED DESCRIPTION

Hereinafter, a suitable embodiment in the present invention will be described in detail with reference to the accompanying drawings. In the description of the drawings, identical or equivalent elements are denoted by the same reference signs, and overlapped descriptions are omitted.

Figure 1:
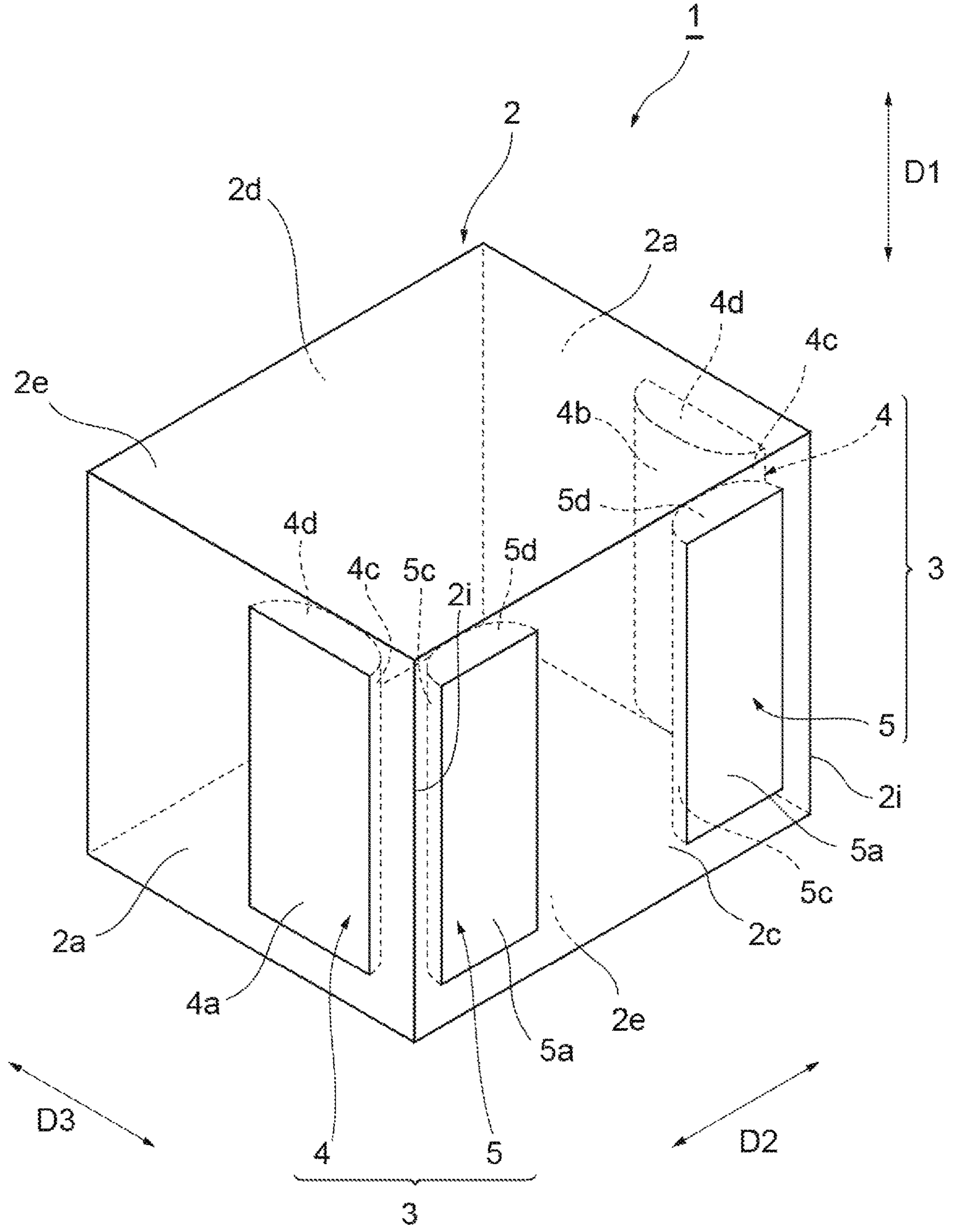
FIG. 1 is a perspective view of a multilayer coil component according to an embodiment.

As shown in FIG. 1, a multilayer coil component 1 includes an element body 2 having a rectangular parallelepiped shape, a pair of terminal electrodes 3 disposed at both end portions of the element body 2, a coil 10, and connecting conductors 26 and 27. The rectangular parallelepiped shape includes a rectangular parallelepiped shape in which the corner portions and the ridge portions are chamfered, and a rectangular parallelepiped shape in which the corner portions and the ridge portions are rounded.

The element body 2 has a pair of end faces 2*a* opposed to each other, main faces 2*c* and 2*d* opposed to each other, and a pair of side faces 2*e* opposed to each other. In the following description, it is assumed that the direction in which the two side faces 2*e* are opposed is a first direction D1, that the direction in which the two end faces 2*a* are opposed is a second direction D2, and that the direction in which the main faces 2*c* and 2*d* are opposed is a third direction D3. The first direction D1, the second direction D2, and the third direction D3 intersect (in this description, are orthogonal to) each other. In the present embodiment, the first direction D1 is the width direction of the element body 2. The first direction D1 is also the short-sides direction of the main faces 2*c* and 2*d*. The second direction D2 is the length direction of the element body 2. The second direction D2 is also the long-sides direction of the main faces 2*c* and 2*d*. The third direction D3 is the height direction of the element body 2.

The two end faces 2*a* extend in the third direction D3 in such a way as to connect the main faces 2*c* and 2*d*. The two end faces 2*a* also extend in the first direction D1 in such a way as to connect the two side faces 2*e*. The main faces 2*c* and 2*d* extend in the second direction D2 in such a way as to connect the two end faces 2*a*. The main faces 2*c* and 2*d* also extend in the first direction D1 in such a way as to connect the two side faces 2*e*. The two side faces 2*e* extend in the third direction D3 in such a way as to connect the main faces 2*c* and 2*d*. The two side faces 2*e* also extend in the second direction D2 in such a way as to connect the two end faces 2*a*. The multilayer coil component 1 is, for example, to be solder-mounted on an electronic device (for example, a circuit board or an electronic component). In the multilayer coil component 1, the main face 2*c* constitutes a mounting surface opposed to the electronic device.

Figure 2B:
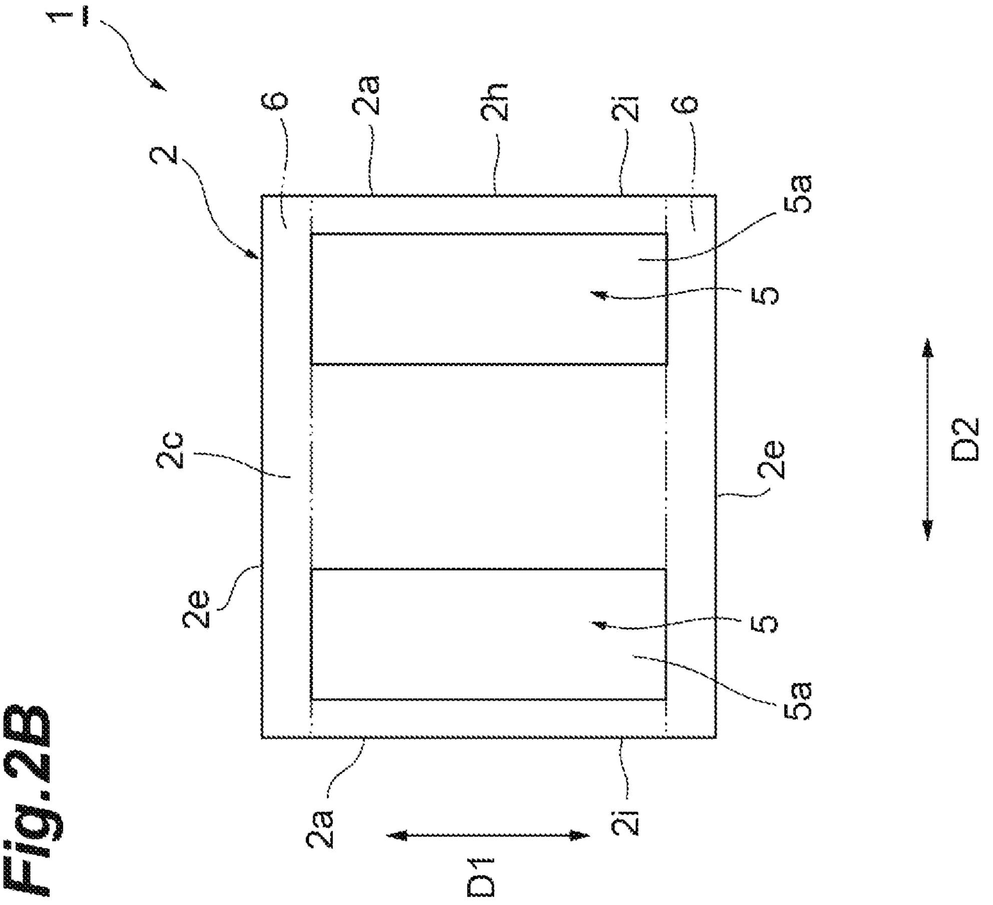
FIG. 2B is a bottom view of the multilayer coil component in FIG. 1.
Figure 2A:
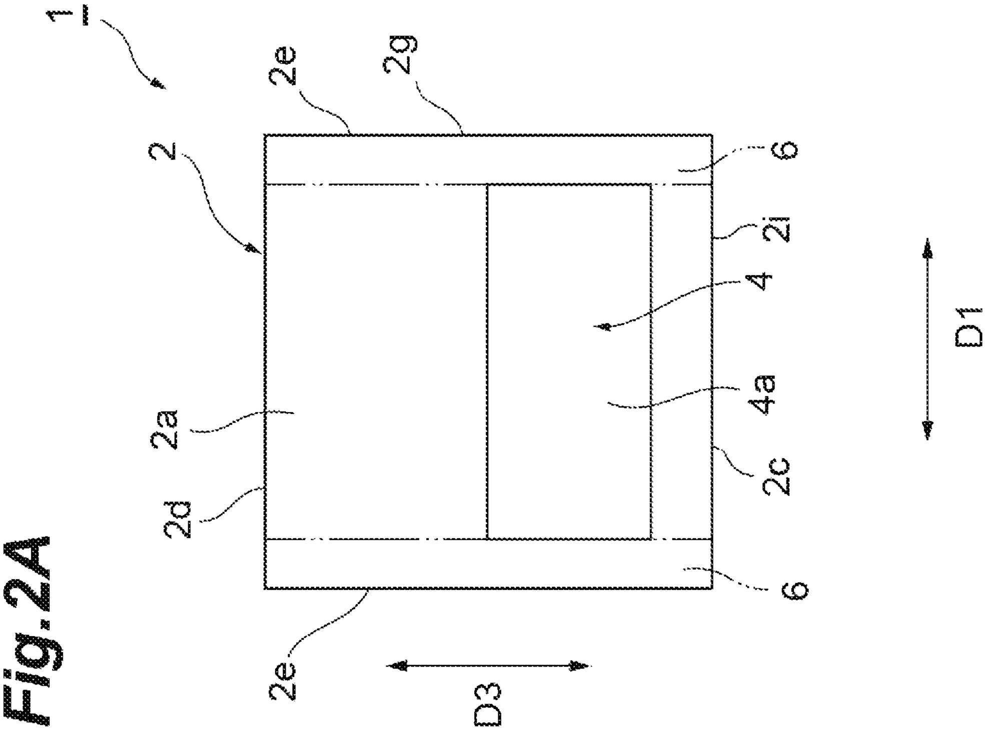
FIG. 2A is a side view of the multilayer coil component in FIG. 1.
Figure 3:
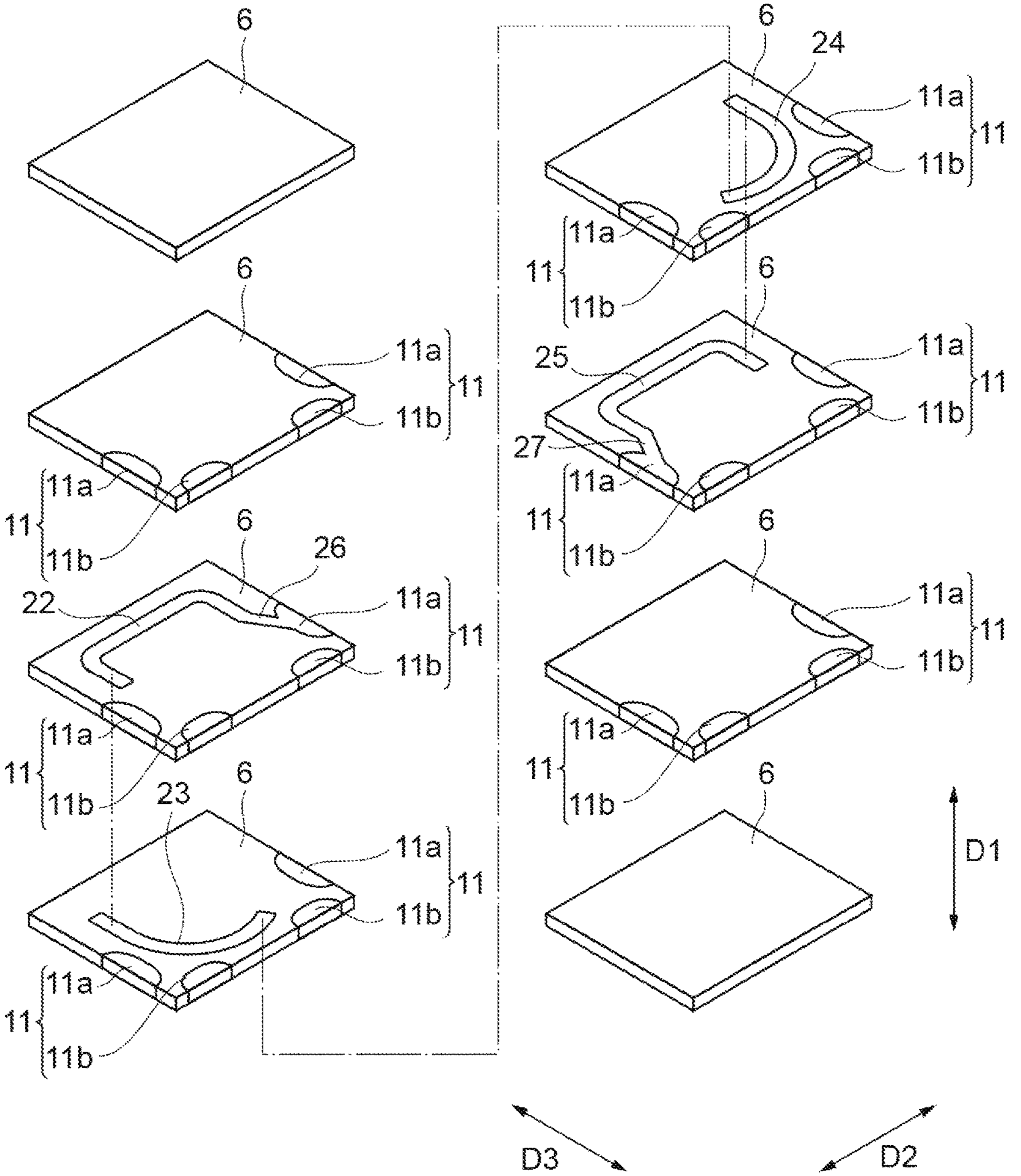
FIG. 3 is an exploded perspective view of the multilayer coil component in FIG. 1.

As shown in FIGS. 2A, 2B, and 3, the element body 2 is formed by laminating a plurality of insulator layers 6 in the first direction D1. The element body 2 includes the insulator layers 6 laminated in the first direction D1. In the element body 2, the lamination direction in which the insulator layers 6 are laminated is aligned with the first direction D1. In the actual element body 2, the insulator layers 6 are integrated in such a way that boundaries between the insulator layers 6 cannot be visually recognized. In FIGS. 2A and 2B, the insulator layers 6 positioned at other than both end portions in the lamination direction are not shown.

Each insulator layer 6 is formed of a dielectric material containing a glass component. That is, the element body 2 contains, as a compound of the elements constituting the element body 2, a dielectric material containing a glass component. The glass component is, for example, borosilicate glass. The dielectric material is, for example, $BaTiO_3$-based, $Ba(Ti, Zr)O_3$-based, or $(Ba, Ca)TiO_3$-based dielectric ceramic. Each insulator layer 6 is formed by a sintered body of a ceramic green sheet containing a glass-ceramic material.

Figure 4:
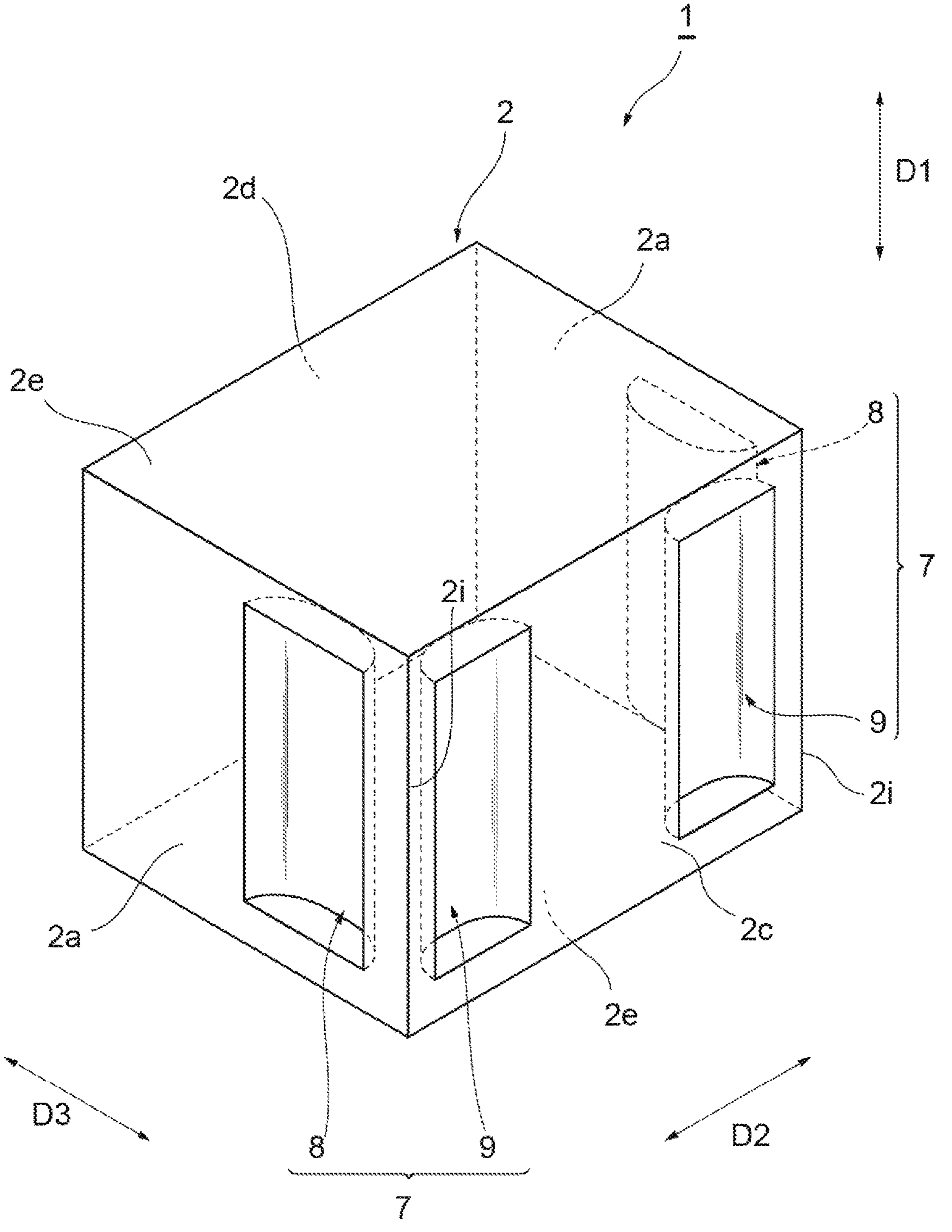
FIG. 4 is a perspective view of an element body in FIG. 1.

As shown in FIG. 4, the element body 2 includes a pair of depressions 7. The two depressions 7 are separated from each other in the second direction D2. Each depression 7 is a space recessed inward from the outer surface of the element body 2. Each depression 7 has a shape matching with the shape of the corresponding terminal electrode 3. The two depressions 7 have the same shape.

A first depression 7 is provided on a first end face 2*a* side of the element body 2. A second depression 7 is provided on a second end face 2*a* side of the element body 2. Each depression 7 includes an end-face depression 8 provided on the corresponding end face 2*a*, and a main-face depression 9 provided on the main face 2*c*. The end-face depression 8 and the main-face depression 9 are adjacent to each other interposing a ridge portion 2*i* formed by the main face 2*c* and the end face 2*a* of the element body 2. The end-face depression 8 and the main-face depression 9 are not connected to each other. The end-face depression 8 of the first depression 7 is provided on the first end face 2*a*. The end-face depression 8 of the second depression 7 is provided on the second end face 2*a*. The main-face depression 9 of the first depression 7 is provided closer to the first end face 2*a* than the main-face depression 9 of the second depression 7.

As shown in FIGS. 1 to 5, the two terminal electrodes 3 are separated from each other in the second direction D2. Each terminal electrode 3 is embedded in the element body 2. Each terminal electrode 3 is disposed in the corresponding depression 7. Each terminal electrode 3 has a rectangular plate shape. The two terminal electrodes 3 have the same shape. The two terminal electrodes 3 are electrically connected to respective end portions 10*a* of the coil 10.

A first terminal electrode 3 is provided on the first end face 2*a* side of the element body 2. A second terminal electrode 3 is provided on the second end face 2*a* side of the element body 2. Each terminal electrode 3 includes an electrode portion 4 and an electrode portion 5. The electrode portion 4 is provided in the end-face depression 8 and is in contact with the inner surface of the end-face depression 8. The electrode portion 5 is provided in the main-face depression 9 and is in contact with the inner surface of the main-face depression 9.

The electrode portions 4 and 5 are provided as separate bodies. The electrode portions 4 and 5 are adjacent to each other interposing the ridge portion 2*i*. The electrode portions 4 and 5 are separated from each other interposing the ridge portion 2*i* and are not connected to each other. The electrode portions 4 and 5 are not electrically connected to each other in the element body 2. That is, the electrode portions 4 and 5 are electrically insulated from each other in the element body 2. Each terminal electrode 3 is not formed from the end face 2*a* to the main face 2*c*. Each terminal electrode 3 is not provided on the ridge portion 2*i*. Each terminal electrode 3 is not exposed on the ridge portion 2*i*. No conductor layer is exposed on the ridge portion 2*i*, but the insulator layers 6 are exposed on the ridge portion 2*i*. The electrode portions 4 and 5 are electrically connected to each other by soldering outside the element body 2 when, for example, the multilayer coil component 1 is solder-mounted on a mounting substrate.

The electrode portion 4 has a substantially rectangular plate shape and is provided along the end face 2*a*. The electrode portion 4 has an exposed face 4*a*, an opposing face

4*b*, a pair of side faces 4*c*, and a pair of side faces 4*d*. The exposed face 4*a* is exposed on the end face 2*a* and is substantially flush with the end face 2*a*. The exposed face 4*a* has a rectangular shape. The exposed face 4*a* has a pair of long sides along the first direction D1 and a pair of short sides along the third direction D3. The exposed face 4*a* is separated from an outer edge 2*g* of the end face 2*a* when viewed from the second direction D2. The exposed face 4*a* is surrounded by the end face 2*a*. The end face 2*a* surrounds the entire circumference of the exposed face 4*a*.

The opposing face 4*b* is opposed to the exposed face 4*a* in the second direction D2. The opposing face 4*b* is disposed parallel to the exposed face 4*a*. When viewed from the second direction D2, the entire opposing face 4*b* overlaps the exposed face 4*a*. In the present embodiment, the opposing face 4*b* is a flat surface, but may be a curved surface.

The two side faces 4*c* connect the exposed face 4*a* and the opposing face 4*b*. The two side faces 4*c* are opposed to each other in the third direction D3. Each side face 4*c* is a curved surface and smoothly connected to the opposing face 4*b*. When viewed from the second direction D2, the two entire side faces 4*c* overlap with the exposed face 4*a*. In the present embodiment, each side face 4*c* is entirely a curved surface, but a part (for example, a portion on the opposing face 4*b* side) may be a curved surface, or the entire part may be a flat surface. The two side faces 4*c* have the same shape, but may have different shapes from each other.

The two side faces 4*d* connect the exposed face 4*a* and the opposing face 4*b*. The two side faces 4*d* are opposed to each other in the first direction D1. In this embodiment, each side face 4*d* is a flat surface and is disposed parallel to the side face 2*e*. Each side face 4*d* may be a curved surface. The two side faces 4*d* have the same shape, but may have different shapes from each other.

The electrode portion 5 has a substantially rectangular plate shape and is provided along the main face 2*c*. The electrode portion 5 has an exposed face 5*a*, an opposing face 5*b*, a pair of side faces 5*c*, and a pair of side faces 5*d*. The exposed face 5*a* is exposed on the main face 2*c* and is substantially flush with the main face 2*c*. The exposed face 5*a* has a rectangular shape. The exposed face 5*a* has a pair of long sides along the first direction D1 and a pair of short sides along the second direction D2. The exposed face 5*a* is separated from an outer edge 2*h* of the main face 2*c* when viewed from the third direction D3. The exposed face 5*a* is surrounded by the main face 2*c*. The main face 2*c* surrounds the entire circumference of the exposed face 5*a*.

The opposing face 5*b* is opposed to the exposed face 5*a* in the third direction D3. The opposing face 5*b* is disposed parallel to the exposed face 5*a*. When viewed from the third direction D3, the entire opposing face 5*b* overlaps the exposed face 5*a*. In the present embodiment, the opposing face 5*b* is a flat surface, but may be a curved surface.

The two side faces 5*c* connect the exposed face 5*a* and the opposing face 5*b*. The two side faces 5*c* are opposed to each other in the second direction D2. Each side face 5*c* is a curved surface and smoothly connected to the opposing face 5*b*. When viewed from the third direction D3, the two entire side faces 5*c* overlap the exposed face 5*a*. In the present embodiment, each side face 5*c* is entirely a curved surface, but a part (for example, a portion on the opposing face 5*b* side) may be a curved surface, or the entire part may be a flat surface. The two side faces 5*c* have the same shape, but may have different shapes from each other.

The two side faces 5*d* connect the exposed face 5*a* and the opposing face 5*b*. The two side faces 5*d* are opposed to each other in the first direction D1. In the present embodiment, each side face 5*d* is a flat surface and is disposed parallel to the side face 2*e*. Each side face 5*d* may be a curved surface. The two side faces 5*d* have the same shape, but may have different shapes from each other.

As shown in FIG. 3, each terminal electrode 3 is formed by laminating a plurality of electrode layers 11. In the present embodiment, the number of electrode layers 11 is "6". Each electrode layer 11 is provided in a defective portion formed in the corresponding insulator layer 6. The defective portion constitutes the depression 7. Each electrode layer 11 contains a conductive material. The conductive material contains, for example, Ag or Pd. Each electrode layer 11 is formed as a sintered body of a conductive paste containing conductive material powder. The conductive material powder contains, for example, Ag powder or Pd powder. Each electrode layer 11 may further contain a glass component. That is, each electrode layer 11 may be formed as a sintered body of a conductive paste containing a metal component and a glass component made of the conductive material powder. The glass component is a compound of the elements constituting the element body 2 and is the same component as the glass component contained in the element body 2. The content of the glass component is only required to be appropriately set. Each electrode layer 11 includes layer portions 11*a* and 11*b*. The layer portion 11*a* extends along the third direction D3. The layer portion 11*b* extends along the second direction D2.

The electrode portion 4 is formed by laminating the layer portions 11*a* of the electrode layers 11. In the electrode portion 4, the layer portions 11*a* are integrated in such a way that boundaries between the layer portions 11*a* cannot be visually recognized. The electrode portion 5 is formed by laminating the layer portions 11*b* of the electrode layers 11. In the electrode portion 5, the layer portions 11*b* are integrated in such a way that boundaries between the layer portions 11*b* cannot be visually recognized.

Figure 5:
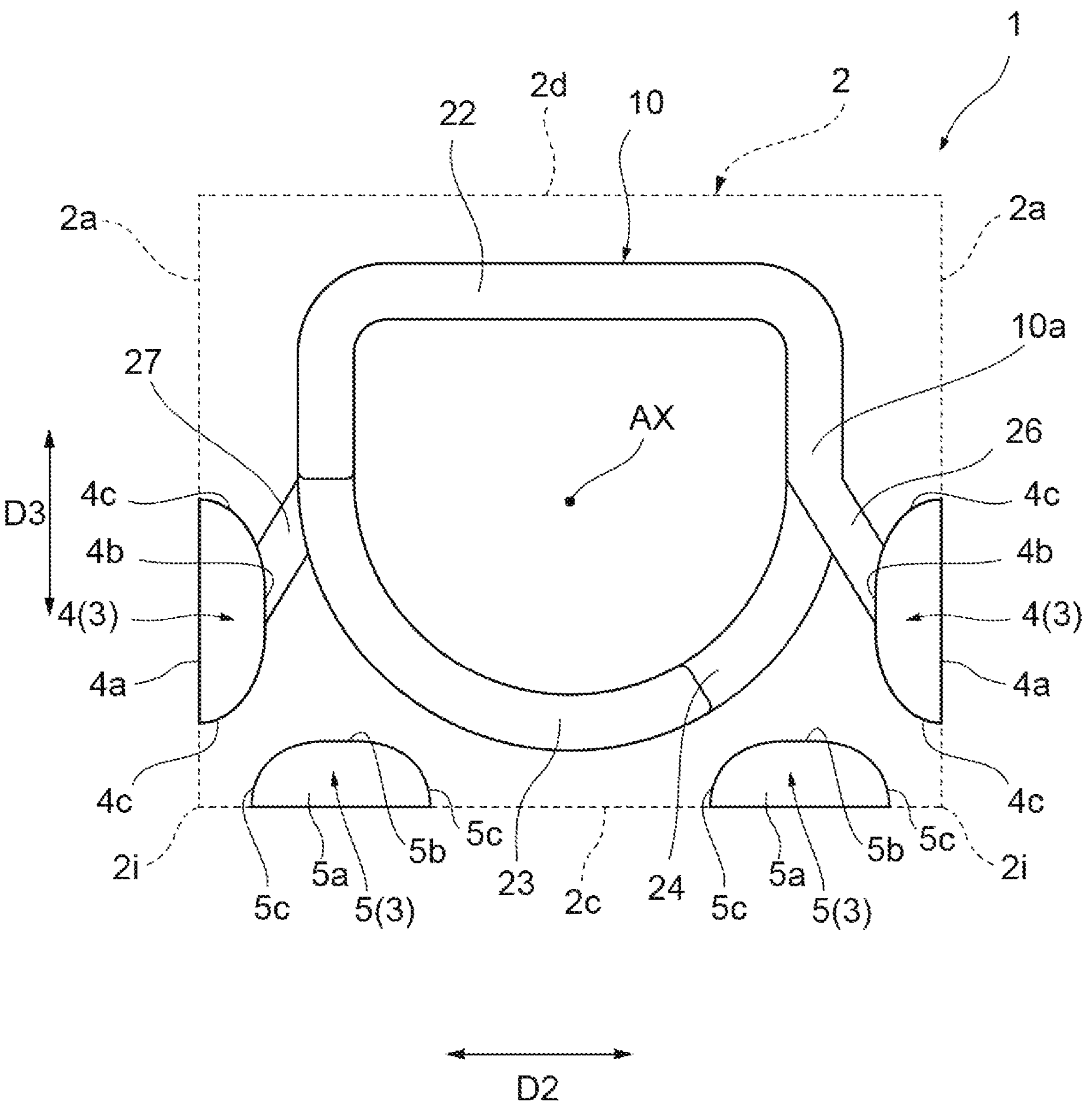
FIG. 5 is a top view of the multilayer coil component in FIG. 1.

As shown in FIG. 5, the coil 10 and the connecting conductors 26 and 27 are disposed in the element body 2 and are not exposed from the element body 2. The coil 10 includes a coil axis AX along the first direction D1. The two end portions 10*a* of the coil 10 are electrically connected to the respective terminal electrodes 3. A first end portion 10*a* is electrically connected to the first terminal electrode 3 by the connecting conductor 26. A second end portion 10*a* is electrically connected to the second terminal electrode 3 by the connecting conductor 27.

As shown in FIG. 3, the coil 10 includes a first coil conductor 22, a second coil conductor 23, a third coil conductor 24, and a fourth coil conductor 25. The first coil conductor 22, the second coil conductor 23, the third coil conductor 24, and the fourth coil conductor 25 are disposed along the first direction D1 in the order of the first coil conductor 22, the second coil conductor 23, the third coil conductor 24, and the fourth coil conductor 25. The first coil conductor 22, the second coil conductor 23, the third coil conductor 24, and the fourth coil conductor 25 each have a shape in which a part of the loop is disconnected, and each have a first end portion and a second end portion.

The first coil conductor 22, the second coil conductor 23, the third coil conductor 24, and the fourth coil conductor 25 are each formed with a predetermined width (the length in the direction intersecting the first direction D1) and a predetermined height (the length in the first direction D1). The first coil conductor 22, the second coil conductor 23, the third coil conductor 24, and the fourth coil conductor 25 are formed with the same width and height.

The first coil conductor 22 is positioned in the same layer as a pair of electrode layers 11. The first coil conductor 22 is connected to the layer portion 11*a* of a second electrode layer 11 positioned in the same layer via the connecting conductor 26. The connecting conductor 26 is positioned in the same layer as the pair of electrode layers 11 and the first coil conductor 22. The connecting conductor 26 connects the first coil conductor 22 and the layer portion 11*a* of the second electrode layer 11. A first end portion of the first coil conductor 22 is connected to the connecting conductor 26. The first end portion of the first coil conductor 22 constitutes the first end portion 10*a* of the coil 10. In the present embodiment, the first coil conductor 22, the connecting conductor 26, and the layer portion 11*a* of the second electrode layer 11 are integrally formed.

As shown in FIG. 5, the connecting conductor 26 is connected to the layer portion 11*a* (electrode portion 4) at a position closer to the main face 2*d* than the center of the layer portion 11*a* in the third direction D3. The connecting conductor 26 has a predetermined width when viewed from the first direction D1. Specifically, the center of the connecting conductor 26 in the width direction is connected to the layer portion 11*a* at a position closer to the main face 2*d* than the center of the layer portion 11*a* in the third direction D3. The connecting conductor 26 is only required to be connected, when viewed from the first direction D1, to the layer portion 11*a* at a position closer to the main face 2*d* than the center of the layer portion 11*a* in the third direction D3 with a portion of more than half of the connecting conductor 26 in the width direction, and may be connected to the layer portion 11*a* at a position closer to the main face 2*c* than the center of the layer portion 11*a* in the third direction D3 with a part of the connecting conductor 26 in the width direction. The connecting conductor 26 extends from the connecting portion at the layer portion 11*a* (electrode portion 4) toward the main face 2*d* along the third direction D3. The connecting conductor 26 has a linear shape and is inclined toward the inside of the element body 2 with respect to the third direction D3. The connecting conductor 26 may connect the first coil conductor 22 and the layer portion 11*b* (electrode portion 5).

The second coil conductor 23 is positioned in the same layer as a pair of electrode layers 11. The second coil conductor 23 is separated from the pair of electrode layers 11 positioned in the same layer. A second end portion of the first coil conductor 22 and a first end portion of the second coil conductor 23 are adjacent to each other in the first direction D1 and are in direct contact with each other. When viewed from the first direction D1, the second end portion of the first coil conductor 22 and the first end portion of the second coil conductor 23 overlap each other.

The third coil conductor 24 is positioned in the same layer as a pair of electrode layers 11. The third coil conductor 24 is separated from the pair of electrode layers 11 positioned in the same layer. A second end portion of the second coil conductor 23 and a first end portion of the third coil conductor 24 are adjacent to each other in the first direction D1 and are in direct contact with each other. When viewed from the first direction D1, the second end portion of the second coil conductor 23 and the first end portion of the third coil conductor 24 overlap each other.

The fourth coil conductor 25 is positioned in the same layer as a pair of electrode layers 11. The fourth coil conductor 25 is connected to the layer portion 11*a* of a first electrode layer 11 positioned in the same layer via the connecting conductor 27. The connecting conductor 27 is positioned in the same layer as the pair of electrode layers 11 and the fourth coil conductor 25. The connecting conductor 27 connects the fourth coil conductor 25 and the layer portion 11*a* of the first electrode layers 11. A second end portion of the fourth coil conductor 25 is connected to the connecting conductor 27. The second end portion of the fourth coil conductor 25 constitutes the second end portion 10*a* of the coil 10. In the present embodiment, the fourth coil conductor 25, the connecting conductor 27, and the layer portion 11*a* of the first electrode layer 11 are integrally formed.

As shown in FIG. 5, the connecting conductor 27 is connected to the layer portion 11*a* (electrode portion 4) at a position closer to the main face 2*d* than the center of the layer portion 11*a* in the third direction D3. The connecting conductor 27 has a predetermined width when viewed from the first direction D1. Specifically, the center of the connecting conductor 27 in the width direction is connected to the layer portion 11*a* at a position closer to the main face 2*d* than the center of the layer portion 11*a* in the third direction D3. The connecting conductor 27 is only required to be connected, when viewed from the first direction D1, to the layer portion 11*a* at a position closer to the main face 2*d* than the center of the layer portion 11*a* in the third direction D3 with a portion of more than half of the connecting conductor 27 in the width direction, and may be connected to the layer portion 11*a* at a position closer to the main face 2*c* than the center of the layer portion 11*a* in the third direction D3 with a part of the connecting conductor 27 in the width direction. The connecting conductor 27 extends from the connecting portion at the layer portion 11*a* (electrode portion 4) toward the main face 2*d* along the third direction D3. The connecting conductor 27 has a linear shape and is inclined toward the inside of the element body 2 with respect to the third direction D3. The connecting conductor 27 may connect the fourth coil conductor 25 and the layer portion 11*b* (electrode portion 5).

The first coil conductor 22, the second coil conductor 23, the third coil conductor 24, the fourth coil conductor 25, and the connecting conductors 26 and 27 each contain a conductive material. The conductive material contains, for example, Ag or Pd. The first coil conductor 22, the second coil conductor 23, the third coil conductor 24, the fourth coil conductor 25, and the connecting conductors 26 and 27 are each formed as a sintered body of a conductive paste containing conductive material powder. The conductive material powder contains, for example, Ag powder or Pd powder.

In the present embodiment, the first coil conductor 22, the second coil conductor 23, the third coil conductor 24, the fourth coil conductor 25, and the connecting conductors 26 and 27 contain the same conductive material as the terminal electrodes 3. The first coil conductor 22, the second coil conductor 23, the third coil conductor 24, the fourth coil conductor 25, and the connecting conductors 26 and 27 may contain a conductive material different from the terminal electrodes 3.

The first coil conductor 22, the second coil conductor 23, the third coil conductor 24, the fourth coil conductor 25, and the connecting conductors 26 and 27 are each provided in a defective portion formed in the corresponding insulator layer 6. The first coil conductor 22, the second coil conductor 23, the third coil conductor 24, the fourth coil conductor 25, and the connecting conductors 26 and 27 are each formed by firing the conductive paste positioned in the defective portion formed in a green sheet.

The defective portion formed in the green sheet is formed by, for example, the following process. First, a green sheet is formed by applying an element-body paste containing a constituent material of the insulator layer 6 and a photosensitive material on a substrate. The substrate is, for example, a PET film. The photosensitive material contained in the element-body paste may be either a negative type or a positive type, and a known photosensitive material can be used. Then, using the mask corresponding to the defective portion, the green sheet is exposed and developed by a photolithography method to form the defective portion in the green sheet on the substrate. The green sheet in which the defective portion is formed is an element-body pattern.

Each electrode layer 11, the first coil conductor 22, the second coil conductor 23, the third coil conductor 24, the fourth coil conductor 25, and the connecting conductors 26 and 27 are formed by, for example, the following process. First, a conductor material layer is formed by applying a conductive paste containing a photosensitive material on a substrate. The photosensitive material contained in the conductive paste may be either a negative type or a positive type, and a known photosensitive material can be used. Then, using the mask corresponding to the defective portion, the conductor material layer is exposed and developed by a photolithography method to form a conductor pattern corresponding to the shape of the defective portion on the substrate.

The multilayer coil component 1 is obtained by, for example, the following process following the process described above. The conductor pattern is combined with the defective portion of the element-body pattern to prepare a sheet in which the element-body pattern and the conductor pattern are in the same layer. After heat-treating a laminate obtained by laminating the predetermined number of prepared sheets, a plurality of green chips are obtained from the laminate. In this process, the green laminate is cut into chips by, for example, a cutting machine. As a result, a plurality of green chips having a predetermined size can be obtained. Next, the green chips are fired. With this firing, the multilayer coil component 1 is obtained. The surface of each terminal electrode 3 may be formed with a plating layer. The plating layer is formed by, for example, electroplating or electroless plating. The plating layer contains, for example, Ni, Sn, or Au.

As described above, in the multilayer coil component 1 according to the present embodiment, the exposed face 4*a* of each electrode portion 4 is separated from the outer edge 2*g* of the end face 2*a*, and the exposed face 5*a* of each electrode portion 5 is separated from the outer edge 2*h* of the main face 2*c*. That is, the entire exposed face 4*a* is surrounded by the end face 2*a*, and the entire exposed face 5*a* is surrounded by the main face 2*c*. Thus, the area in which the electrode portions 4 and 5 are in contact with the element body 2 is larger than that when the terminal electrode 3 is continuously formed from the end face 2*a* to the main face 2*c*. Accordingly, the adhesive force between the terminal electrode 3 (that is, the electrode portions 4 and 5) and the element body 2 is increased, and peeling off of the terminal electrode 3 from the element body 2 is prevented.

For example, in order to inspect the characteristics of the multilayer coil component 1, an inspection pin can be pressed against the exposed face 5*a* of the terminal electrode 3. In the multilayer coil component 1, the adhesive force between the terminal electrode 3 and the element body 2 is increased, and peeling off of the terminal electrode 3 from the element body 2 is prevented although such an external stress is applied.

The inspection pin can be pressed against a portion of the main face 2*c* adjacent to the short side of the exposed face 5*a* beyond the exposed face 5*a*. The portion of the main face 2*c* adjacent to the short side of the exposed face 5*a* is constituted by the insulator layer 6 positioned at the end of the lamination, as shown in FIG. 2B. Here, as a comparative example, a multilayer coil component in which a long side of the exposed face 5*a* aligns with the outer edge 2*h* is considered. In the multilayer coil component in this comparative example, the insulator layer 6 positioned at the end of the lamination is adhere to the adjacent insulator layer 6 only at the center portion in the second direction D2 (the portion between the two electrode portions 5) in the region near the main face 2*c*. The adhesive force between the insulator layer 6 and the terminal electrode 3 is weaker than the adhesive force between the insulator layers 6. Thus, if an inspection pin is pressed against the portion of the main face 2*c* adjacent to the short side of the exposed face 5*a*, the insulator layer 6 positioned at the end of the lamination can peel off.

In contrast, in the present embodiment, the insulator layer 6 positioned at the end of the lamination is adhere to the adjacent insulator layer 6 not only at the center portion in the second direction D2 (the portion between the two electrode portions 5) but also at both end portions in the second direction D2 (the portions outside the two electrode portions 5) in the region near the main face 2*c*. Thus, although an inspection pin is pressed against the portion of the main face 2*c* adjacent to the short side of the exposed face 5*a*, peeling off of the insulator layer 6 positioned at the end of the lamination is prevented.

As another comparative example, a multilayer coil component in which a long side of the exposed face 4*a* aligns with the outer edge 2*h* (the outer edge 2*h* on the main face 2*c* side) is considered. In the multilayer coil component in this comparative example, the electrode portion 4 is easily exposed on the main face 2*c*. If an inspection pin is pressed against the exposed portion of the electrode portion 4 on the main face 2*c*, the electrode portion 4 can peel off.

In contrast, in the present embodiment, the exposed face 4*a* is separated from the outer edge 2*h* and is not exposed on the main face 2*c*. Thus, the inspection pin pressed against the main face 2*c* is not pressed against the electrode portion 4. Accordingly, peeling off of the electrode portion 4 is prevented.

Each side face 4*c* is curved. Thus, each side face 4*c* and the opposing face 4*b* are smoothly connected to each other. Accordingly, the occurrence of cracks in the element body 2 due to the corner portion formed by each side face 4*c* and the opposing face 4*b* is prevented. Each side face 5*c* is curved. Thus, each side face 5*c* and the opposing face 5*b* are smoothly connected to each other. Accordingly, the occurrence of cracks in the element body 2 due to the corner portion formed by each side face 5*c* and the opposing face 5*b* is prevented.

Each of the connecting conductors 26 and 27 is connected to the electrode portion 4 at a position closer to the main face 2*d* than the center of the electrode portion 4 in the third direction D3, and extends toward the main face 2*d*. Thus, the region in which the electrode portion 4 is opposed to each of the connecting conductors 26 and 27 in the second direction D2 via the element body 2 is smaller than that when each of the connecting conductors 26 and 27 is connected to the electrode portion 4 at a position closer to the main face 2*c* than the center of the electrode portion 4 in the third direction D3 and extends toward the main face 2*d* or when each of the connecting conductors 26 and 27 is connected to the electrode portion 4 at a position closer to the main face 2*d* than the center of the electrode portion 4 in the third direction D3 and extends toward the main face 2*c*. As a result, it is possible to reduce the stray capacitance formed between the electrode portion 4 and each of the connecting conductors 26 and 27.

If, for example, the multilayer coil component 1 is solder-mounted on a mounting substrate and the electrode portions 4 and 5 are connected to each other outside the element body 2, the configuration in which the electrode portions 4 and 5 are electrically connected to each other inside the element body 2 has two current paths between the electrode portions 4 and 5 inside and outside the element body 2, which can adversely affect the electrical characteristics. In contrast, in the present embodiment, the electrode portions 4 and 5 are electrically insulated from each other in the element body 2. As a result, the current path between the electrode portions 4 and 5 is one, and it is possible to reduce the effect on the electrical characteristics. In addition, the electrode portions 4 and 5 are separately formed as separate bodies, and it is possible to reduce the amount of shrinkage during firing as compared with the case of the electrode portions 4 and 5 being integrally formed.

The coil 10 includes a coil axis AX along the first direction D1. Thus, a magnetic flux along the first direction D1 is generated. The terminal electrodes 3 are provided on the main face 2*c* and the end faces 2*a* extending along the first direction D1 and are not provided on the side faces 2*e* intersecting the first direction D1. Thus, the magnetic flux intersecting with the terminal electrodes 3 is reduced as compared with that when the terminal electrodes 3 are provided on the side faces 2*e*. Accordingly, it is possible to improve the Q value.

The embodiment of the present invention has been described above; the present invention is not necessarily limited to the above described embodiment, and can be variously changed without departing from the gist.

Figure 6B:
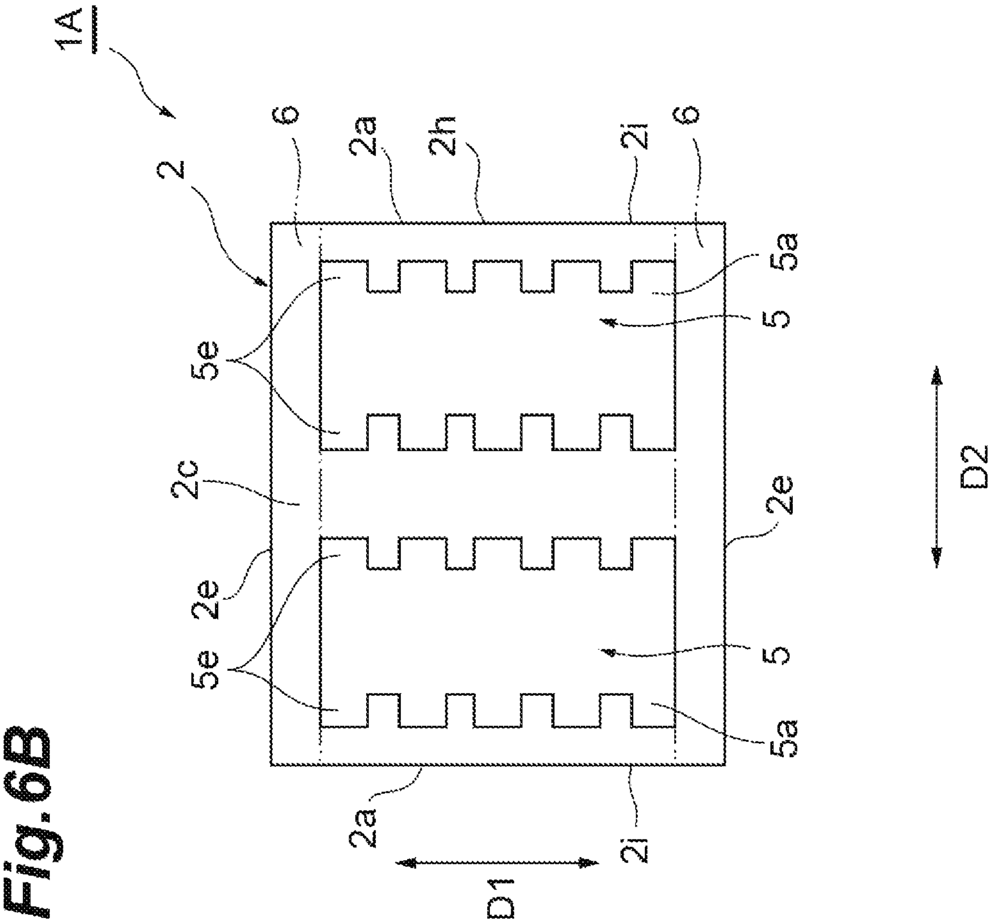
FIG. 6B is a bottom view of the multilayer coil component according to the modified example.
Figure 6A:
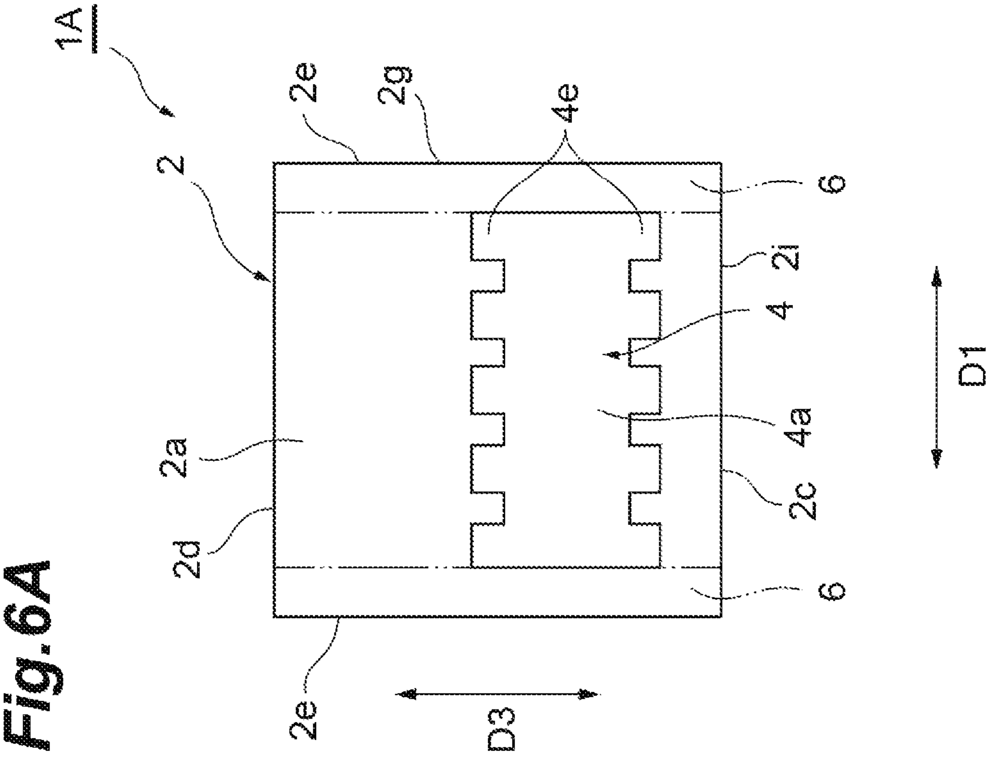
FIG. 6A is a side view of a multilayer coil component according to a modified example.

As shown in FIGS. 6A and 6B, a multilayer coil component 1A according to a modified example is different from the multilayer coil component 1 according to the embodiment mainly in the shape of the terminal electrodes 3. In the multilayer coil component 1A, end portions 4*e* and 5*e* of the electrode portions 4 and 5 each have an uneven shape. Specifically, the end portion 4*e* of the electrode portion 4 in the third direction D3 (including the long sides of the exposed face 4*a*) and the end portion 5*e* of the electrode portion 5 in the second direction D2 (including the long sides of the exposed face 5*a*) each have an uneven shape. Both end portions 4*e* of the electrode portion 4 in the third direction D3 may have an uneven shape, or one end portion 4*e* may have an uneven shape. Both end portions 5*e* of the electrode portion 5 in the second direction D2 may have an uneven shape, or one end portion 5*e* may have an uneven shape. The multilayer coil component 1A is formed by alternately laminating a layer having layer portions 11*a* and 11*b* each having a long extending length corresponding to a projection and a layer having layer portions 11*a* and 11*b* each having a short extending length corresponding to a depression.

Also in the multilayer coil component 1A, the exposed face 4*a* is separated from the outer edge 2*g* of the end face 2*a*, and the exposed face 5*a* is separated from the outer edge 2*h* of the main face 2*c*. Accordingly, peeling off of the terminal electrode 3 is prevented. In addition, the end portions 4*e* and 5*e* of the electrode portions 4 and 5 each have an uneven shape, and the adhesive force between each of the electrode portions 4 and 5 and the element body 2 is increased. Accordingly, peeling off of the terminal electrode 3 is further prevented.

In the above embodiment, the coil 10 having the first coil conductor 22, the second coil conductor 23, the third coil conductor 24, and the fourth coil conductor 25 has been exemplified. However, the number of coil conductors forming the coil 10 is not limited to four.

In the above embodiment, the exposed face 4*a* is substantially flush with the end face 2*a*, but the exposed face 4*a* may protrude from the end face 2*a* or may be recessed from the end face 2*a*. The exposed face 5*a* is substantially flush with the main face 2*c*, but the exposed face 5*a* may protrude from the main face 2*c* or may be recessed from the main face 2*c*. Each of the exposed faces 4*a* and 5*a* is not limited to a flat surface, but may be a curved surface.

The electrode portions 4 and 5 may be electrically connected to each other in the element body 2. In this case, a plating film can be formed by electroplating.

What is claimed is:

1. A multilayer coil component comprising:

an element body including a plurality of insulator layers laminated in a first direction;

a coil disposed in the element body; and a terminal electrode disposed on the element body, wherein the element body has a rectangular parallelepiped shape, a first side face and a second side face opposed to each other in the first direction, a first end face and a second end face opposed to each other in a second direction intersecting the first direction, and a first main face and a second main face opposed to each other in a third direction intersecting the first direction and the second direction, the terminal electrode includes a first electrode portion having a first exposed face exposed on the first main face and a second electrode portion having a second exposed face exposed on the first end face, the first exposed face and the second exposed face are adjacent to each other interposing a ridge portion formed by the first main face and the first end face of the element body, no terminal electrode is provided on the ridge portion and no conductor is exposed on the ridge portion, the first exposed face is separated from an outer edge of the first main face, and the second exposed face is separated from an outer edge of the first end face.

2. The multilayer coil component according to claim 1, wherein the coil includes a coil axis along the first direction.

3. The multilayer coil component according to claim 1 further comprising:

a connecting conductor connecting an end portion of the coil and the second electrode portion, wherein the connecting conductor is connected closer to the second main face than a center of the second electrode portion in the third direction and extends toward the second main face.

4. The multilayer coil component according to claim 1, wherein the first electrode portion has a first opposing face opposed to the first exposed face, and a pair of third side faces connecting the first exposed face and the first opposing face and opposed to each other in the second direction, and each of the pair of third side faces is curved.

5. The multilayer coil component according to claim 1, wherein the second electrode portion has a second opposing face opposed to the second exposed face, and a pair of fourth side faces connecting the second exposed face and the second opposing face and opposed to each other in the third direction, and each of the pair of fourth side faces is curved.

6. The multilayer coil component according to claim 1, wherein the first electrode portion and the second electrode portion are not electrically connected to each other in the element body.

7. The multilayer coil component according to claim 1, wherein the first electrode portion includes an end portion in the third direction, and the end portion has an uneven shape.

8. The multilayer coil component according to claim 1, wherein the second electrode portion includes an end portion in the second direction, and the end portion has an uneven shape.

9. A multilayer coil component comprising:

an element body including a plurality of insulator layers laminated in a first direction;

a coil disposed in the element body; and a terminal electrode disposed on the element body, wherein the element body has a rectangular parallelepiped shape, a first side face and a second side face opposed to each other in the first direction, a first end face and a second end face opposed to each other in a second direction intersecting the first direction, and a first main face and a second main face opposed to each other in a third direction intersecting the first direction and the second direction, the terminal electrode includes a first electrode portion having a first exposed face exposed on the first main face and a second electrode portion having a second exposed face exposed on the first end face, the first exposed face and the second exposed face are adjacent to each other interposing a ridge portion formed by the first main face and the first end face of the element body, the first exposed face is separated from an outer edge of the first main face without a conductor exposed on the first main face between the first exposed face and the outer edge of the first main face, and the second exposed face is separated from an outer edge of the first end face without a conductor exposed on the first end face between the second exposed face and the outer edge of the first end face.

* * * * *